Aug. 21, 1956   T. L. FAWICK   2,759,568
FLUID-ACTUATED ASSEMBLY FOR BRAKES AND CLUTCHES
Filed March 20, 1951   4 Sheets-Sheet 1

INVENTOR.
THOMAS L. FAWICK
BY
Willard D. Eakin
ATTORNEY

Aug. 21, 1956 T. L. FAWICK 2,759,568
FLUID-ACTUATED ASSEMBLY FOR BRAKES AND CLUTCHES
Filed March 20, 1951 4 Sheets-Sheet 2

INVENTOR.
THOMAS L. FAWICK
BY Willard D. Eakin
ATTORNEY

Aug. 21, 1956 T. L. FAWICK 2,759,568
FLUID-ACTUATED ASSEMBLY FOR BRAKES AND CLUTCHES
Filed March 20, 1951 4 Sheets-Sheet 3

INVENTOR.
THOMAS L. FAWICK
BY Willard D. Eakin
ATTORNEY

Aug. 21, 1956 T. L. FAWICK 2,759,568
FLUID-ACTUATED ASSEMBLY FOR BRAKES AND CLUTCHES
Filed March 20, 1951 4 Sheets-Sheet 4
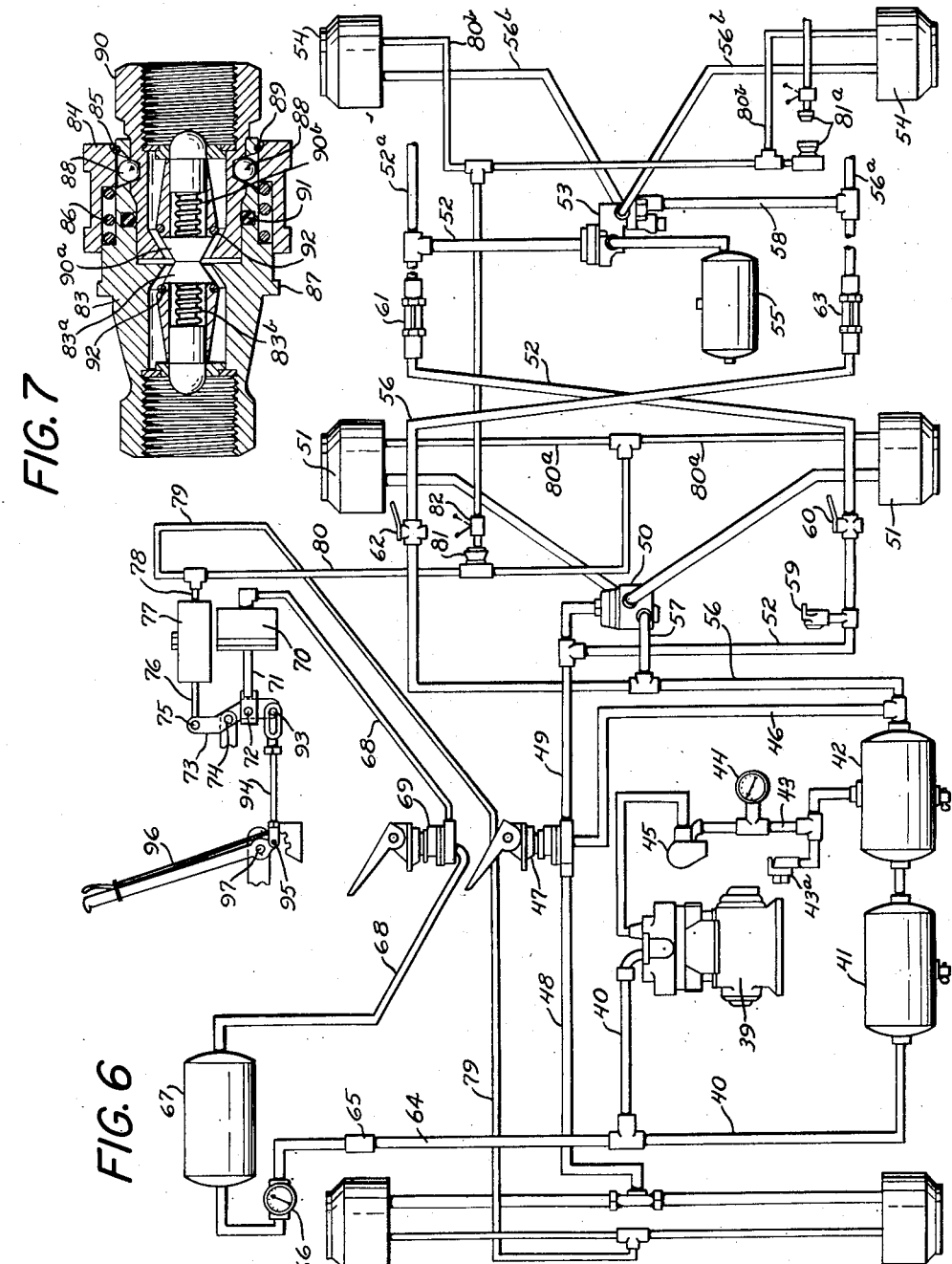
INVENTOR.
THOMAS L. FAWICK
BY
Willard D. Eakin
ATTORNEY United States Patent Office 2,759,568
Patented Aug. 21, 1956

2,759,568

FLUID-ACTUATED ASSEMBLY FOR BRAKES AND CLUTCHES

Thomas L. Fawick, Cleveland, Ohio, assignor, by mesne assignments, to Fawick Corporation, a corporation of Michigan Application March 20, 1951, Serial No. 216,560

6 Claims. (Cl. 188—152)

This invention relates to a fluid-actuated assembly primarily designed for use as a brake but having features that are usable also in a clutch.

Its chief objects are to provide an improved brake especially suitable for use as a vehicle brake; to provide a brake having improved provision for emergency braking and/or for augmenting the force of normal service braking; to provide an improved brake especially suitable for use in a system inclusive of trailer brakes; to provide a brake having advantages as a parking brake; to provide in an improved manner for adjustment to compensate for wear of frictional-engagement members; to provide uniformity of action of all of the frictional-engagement members; to provide for interchangeability of parts; to provide compactness of structure; and to provide simplicity and economy of construction, replacement and repair.

In conjunction with the other advantages just indicated, the uniformity of action is provided by means of a single, circumferentially aligned set of friction shoes identically mounted for identical sustention of torque in relation to their respective mountings.

Of the accompanying drawings:

Fig. 6 is a diagram of a braking system inclusive of brakes embodying the present invention.

Fig. 7 is an axial section of a shut-off fluid coupling which is desirable as a part of the system shown in Fig. 6.

Figure 1:
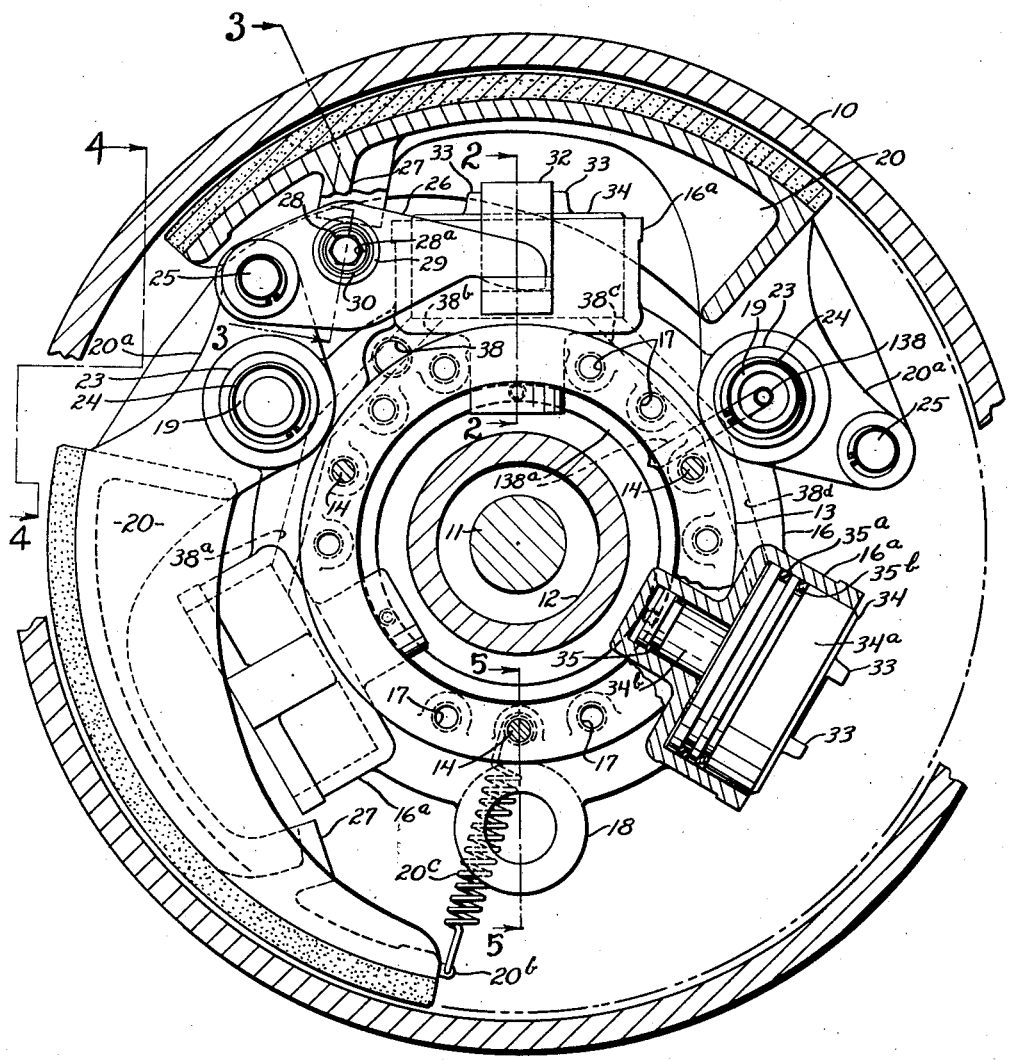
Fig. 1 is a section, with parts sectioned on different planes, and with parts in elevation, of a brake, and a vehicle axle and an axle housing upon which the brake is mounted, but with one of the brake shoes and some of the other parts omitted for clearness of illustration, the assembly embodying my invention in its preferred form as applied to vehicle brakes.
Figure 2:
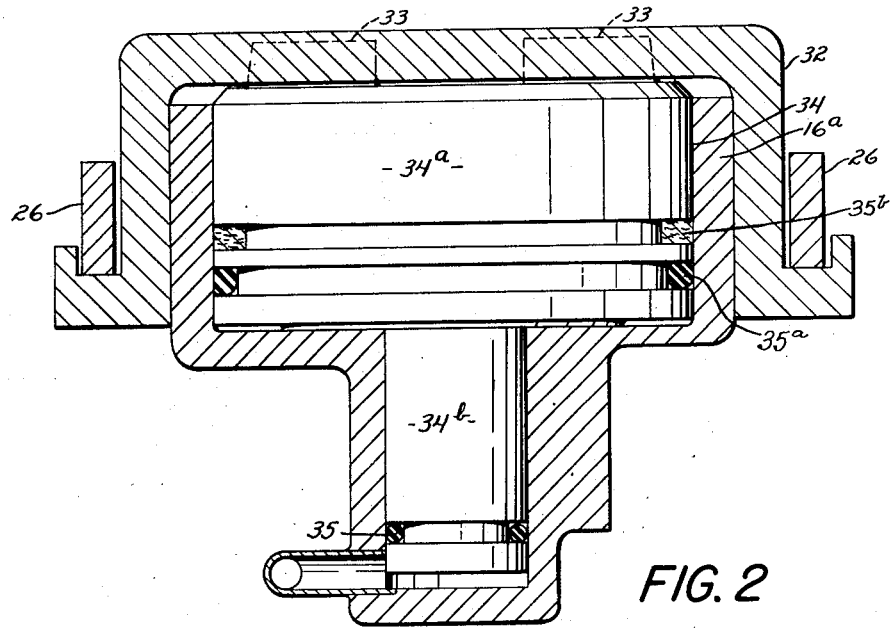
Fig. 2 is a section on line 2—2 of Fig. 1.
Figure 3:
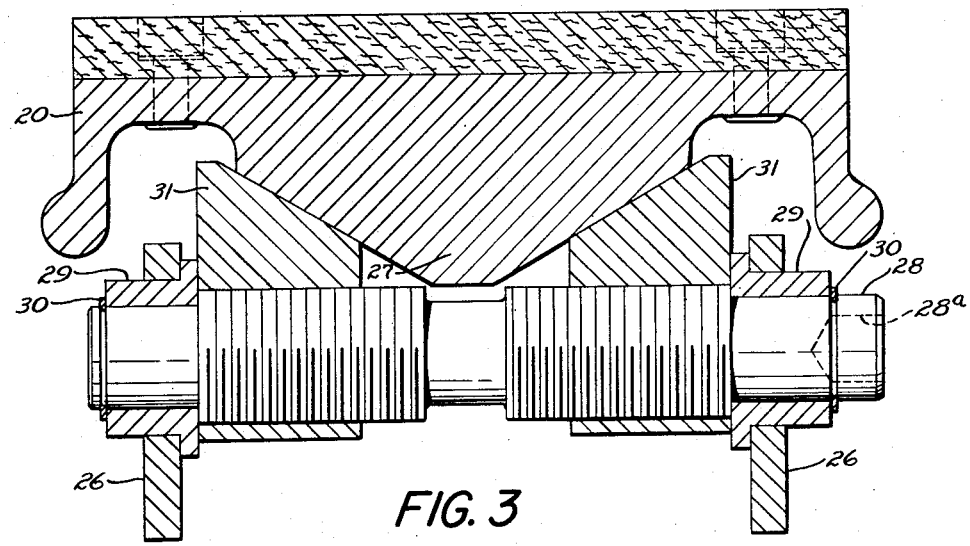
Fig. 3 is a section on line 3—3 of Fig. 1.

Referring first to the brake itself, the construction of which is shown in Figs. 1 to 5, the view in Fig. 1 is toward the closed end of the brake-drum, 10, secured to the wheel of the vehicle (not shown), the vehicle's drive-axle 11 and axle-housing 12 being shown in section.

Secured to the brake-mounting flange 13 of the axle housing (See Fig. 5), by bolts such as the spring-anchoring bolt 14, having turning heads such as the head 15 welded thereon, and by other bolts of conventional form (not shown) is a casting 16 which is the mounting for the working parts of the brake, the casting being formed with threaded holes for the special bolts 14 and with threaded holes 17, 17, (Fig. 1) for the other bolts, of conventional form.

Figure 4:
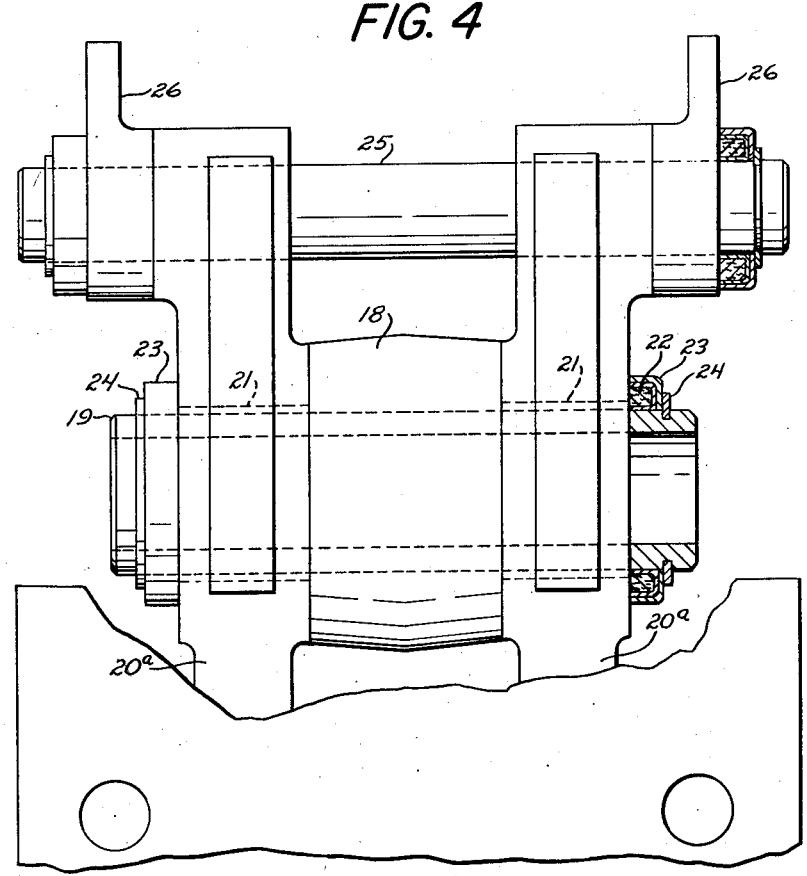
Fig. 4 is an elevation of parts of the brake from a point of view represented by line 4—4 of Fig. 1, a part being broken away and parts being sectioned.
Figure 5:
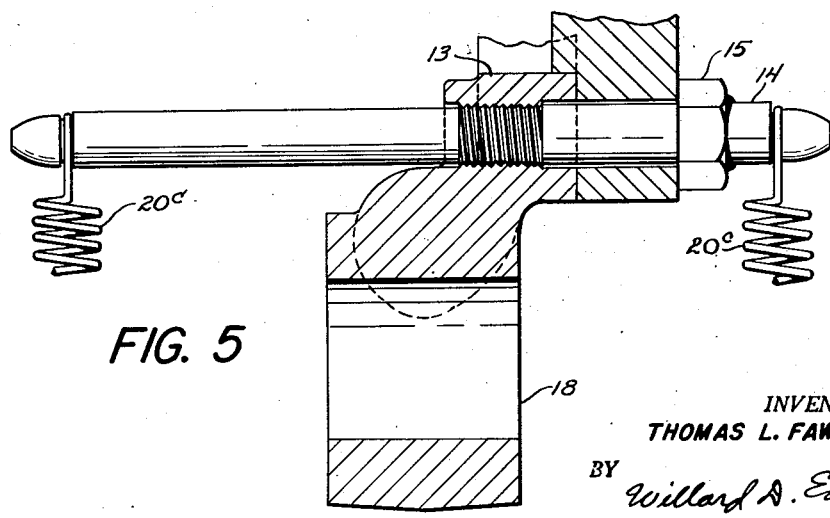
Fig. 5 is a section on line 5—5 of Fig. 1.

The casting 16 is formed on its outer periphery with a plurality of equally spaced apertured lugs, such as the lug 18, Fig. 4. Extending through the aperture of each of these lugs is the hinge-pin 19, preferably tubular, of one of the brake shoes 20, 20.

Each brake shoe 20 is bifurcated at its hinged end, thus having a pair of arms 20ª, 20ª, Fig. 4, which straddle the lug, the hinge pin 19 extending through bronze bushings 21, 21 mounted in holes in the arms 20ª. At each end the hinge-pin 19 is provided with an oil and dust seal 22 in an L-section retaining ring 23 held in place by a snap-ring 24.

The arms 20ª of each pair extend beyond the mounting lug 18 and at their ends have holes in which is mounted the hinge-pin 25 for a pair of brake-engaging levers 26, 26.

Near its swinging end each brake-shoe 20 is formed with an inwardly projecting lug 27 to receive the force of means mounted on the middle parts of the levers 26, for pushing the shoes outward into engagement with the brake-drum 10.

This means comprises a right-and-left threaded pin 28 (see Fig. 3) swiveled at its ends in the respective levers 26, by means of flanged collars 29, 29 retained by snap-rings 30, 30.

Each threaded part of the pin 28 has mounted upon it a complementally threaded cam-block 31, the cam faces of the two blocks being in V-shape relationship and bearing against complemental V faces on the adjacent lug 27 of the brake-shoe.

Each of the threaded pins 28 is formed at one of its ends for engagement by a turning tool, as by being formed with a polygonal recess 28ª in its end face, and the arrangement as described is such that the brake-shoe can be adjusted outwardly in relation to the levers 26, to compensate for wear of the shoe, by turning of the pin 28.

For actuation of the levers 26 to effect brake engagement, their swinging ends are engaged in the respective notches of stirrup-like portions of a U-shaped, saddle-like member 32 mounted, between positioning lugs 33, 33, upon the outer end of a piston member 34.

As the bearing surfaces of the saddle or yoke upon which the levers 26 bear are intermediate the length of the cylinder, radial compactness of structure is provided, and the structure described also provides simplicity and facility of assembly and disassembly.

Each piston member 34 is formed with a large-diameter, air-impelled outer part 34ª and, integral therewith extending axially inward therefrom, a small-diameter, liquid-impelled part 34ᵇ. Each piston member 34 is mounted in a one-way, open-end, cylinder member 16ª, permissibly formed as an integral part of the casting 16, as here shown, and having respective piston chambers in which the large-diameter portion 34ª and the small-diameter portion 34ᵇ of the piston respectively fit and to the walls of which they are slidingly sealed by suitable piston-packings such as those shown at 35, 35ª, 35ᵇ.

For supplying compressed air to the actuating, annular, radially-inner, end faces of the several piston portions 34ª an inner inlet 38, Fig. 1, adapted to be connected to means for supplying compressed air, is formed in the casting 16 and is in communication with a system of drilled holes 38ª, 38ᵇ, 38ᶜ, 38ᵈ in the casting, this system of holes being adapted to conduct the compressed air from the single air inlet 38 to the large-diameter piston chambers of all of the cylinder members 16ª.

For supplying a motive fluid, preferably hydraulic-brake fluid or the like, to the actuating, radially-inner, end faces of the several small-diameter portions 34ᵇ a supply pipe 138 (Fig. 1), permissibly extending through one of the hinge-pins 19 as shown, leads to a conduit 138ª, which can be either a pipe or a hole in the casting 16, and through which the supply pipe 138 is in communication with the small-diameter piston chambers of all of the cylinder members 16a.

For retraction of the brake-shoes 20, each of them formed at its outer end or otherwise provided with a pair of spring-anchoring eyes such as the eye 20b, Fig. 1. The eyes of each pair are connected by respective springs 20c, 20c, Figs. 1 and 5, with respective projecting ends of the adjacent one of the special spring-anchoring bolts 14.

In the operation of the brake as described, in ordinary service the shoes are actuated by compressed air only, supplied to the large diameter portions of the cylinders, but the actuating force of the air can be supplemented at any time, on occasion, as in the case of an emergency, by admitting pressure fluid, preferably at high pressure, to the small-diameter portions of the cylinders.

Also, in case of failure of pressure in the compressed air system, high-pressure fluid from a suitable source can be applied to the small-diameter parts of the pistons to substitute for the normal air braking.

When the piston elements 34a, 34b of each unit are integral, as in the preferred embodiment above described, the piston member, although of the short length appropriate for the short range of movement of the brake-shoes, is well stabilized and free from cramping in the cylinder member, by reason of the slide bearing of the piston member in the cylinder member being of greater length than it would be if only one or the other part of the piston member were employed independently of the other part or if the two parts 34a and 34b were not rigid with relation to each other.

When the direction of rotation of the brake drum is such as to provide self-energizing of the brake shoes, the self-energizing is the same as to all of the shoes, because they are hinged for movement in the same rotative direction for brake engagement. Consequently brake-lining material of the same hardness can be used for all of the shoes.

A braking system of which the above described brake is especially well adapted to be a part is diagrammatically shown in Fig. 6.

This system comprises the usual motor-driven air-compressor 39, providing compressed air, through a line 40, to the usual service tanks 41, 42, and provided with a return line 43, having in it the usual low-pressure indicator 43, air-gauge 44 and governor 45.

From these tanks 41, 42, the usual line 46 leads to the foot-control service valve 47 and from it a service line 48 leads to the front-wheel brakes and a service line 49 leads to the usual relay valve 50 on the tractor which controls the brakes 51, 51 for the rear wheels of the tractor.

The service line 49, through a branch 52, leads also to the usual emergency relay valve 53 on the trailer, which controls the trailer's brakes 54, 54. This valve 53 is associated, as is usual, with an air tank 55 mounted on the trailer and kept constantly charged with air by a line 56 which leads from the tanks 41, 42 and has respective branches 57 and 58 leading respectively to the relay valve 50 on the tractor and the emergency relay valve 53 on the trailer.

The line 52 is provided with the usual stop-light switch 59, shut-off valve 60 and coupling 61 for permitting disconnecting of the trailer, and the line 56 has a corresponding shut-off valve 62 and coupling 63. For permissible connection of the lines 52 and 56 with braking apparatus on a second trailer they are shown with rear-ward extensions broken away at 52a and 56a.

From the compressor's output line 40 an air line 64 leads, through a check-valve 65 and an air gauge 66, to a reserve-and-emergency air-pressure tank 67, preferably but not necessarily mounted on the tractor. This tank is kept constantly charged by the compressor and as the check valve 65 prevents a return flow of air in case of failure of the compressor or any of the conventional air lines the driver has always at his command a reserve or emergency supply of compressed air wholly independent of any such failure.

From the tank 67 a line 68 leads, through a second foot-controlled valve 69, to the right-hand end of a relatively large-diameter cylinder 70 the piston-rod 71 of which is hinged at 72 to the lower arm of a two-armed lever 73 fulcrumed on the tractor at 74. The upper arm of the lever 73 is hinged at 75 to the outer end of the piston-rod 76 of a hydraulic (oil) cylinder 77 of a diameter smaller than that of the air cylinder 70, for high hydraulic pressure. A suitable supply of oil or brake-fluid is contained in the hydraulic system, which comprises the cylinder 77 and a line 78 having a branch 79 leading to the front-wheel brakes, and a branch 80 leading, through sub-branches 80a, 80a to the respective hydraulic cylinders of the brakes for the rear wheels of the tractor, and through a two-way shut-off coupling 81 (Figs. 6 and 7), a hand-lever shut-off valve 82, and sub-branches 80b, 80b, to the respective hydraulic cylinders of the trailer brakes. The oil-cylinder 77 preferably is provided with the usual oil replenishing means, as in the case of the master cylinder of standard hydraulic brakes. For permissible connection of the line 80, 80b with braking apparatus on a second trailer it is shown as being provided with a second two-way shut-off coupling 81a.

These shut-off couplings are old in other associations. Each comprises a casing 83, Fig. 7, having a sleeve 84 slidably mounted upon it, retained thereon by a snap-ring 85, and urged to the right by a spring 86. Sliding of the sleeve 84 to the left, into abutment with a stop-flange 87 on the casing, permits locking balls 88, 88 to be forced outward into an annular corner recess 89 in the casing while still retained by the snap-ring 85, the balls thus moving out of an annular groove in a nipple member 90 and permitting the latter to be moved into or out of the casing. The inner face of the casing is formed with annular groove occupied by a circular-section rubber sealing ring 91 for sealing it to the nipple. The casing 83 and the nipple 90 are internally formed with respective valve seats for respective conical valves 83a, 90a which are backed by respective springs 83b, 90b adapted to permit the conical valves to be opened by abutment of their smaller ends with each other when the nipple 90 is shoved into the casing but to force the respective valves shut when the nipple is removed. Each of the conical valves preferably is provided with a circular-section rubber sealing ring 92 in a groove at the larger end of its conical portion.

This type of shut-off valve permits the line to be uncoupled and recoupled without substantial escape of braking fluid or admission of air to the oil lines and consequently makes it unnecessary to bleed air out of the hydraulic system after the recoupling.

For assisting the cylinder 70, or to substitute for it in case of failure of the emergency system comprising the line 68, the lower arm of the lever 73 extends downward beyond its hinged connection at 72 to the piston-rod 71, and at its lower end the lever arm has lost-motion pin-an-slot connection at 93 to a pull rod 94 hinged at 95 to the lower end of a hand lever 96 fulcrumed on the tractor at 97 and provided with a conventional ratchet and keeper. The lost-motion connection at 92 permits normal functioning of the cylinder 70 while the lever 96 is set in a fixed position but also provides for manual development of pressure in the oil cylinder 77 on occasion, as in an emergency or for parking of the vehicle.

The mode of operation will be manifest from the foregoing description.

Various modifications are possible without sacrifice of all of the advantages set out in the foregoing statement of objects and without departure from the scope of the invention as defined in the appended claims.

I claim:

1. An assembly comprising two relatively rotatable structures adapted for frictional, torque-sustaining engagement with each other, one of said structures having an internal frictional-engagement face and the other of said structures comprising a mounting, a set of frictional-engagement shoes on said mounting and movable outwardly toward and inwardly from said face, and, for actuating each shoe of the set, an open-end cylinder positioned radially inward from the shoe, a piston projectable therefrom, a yoke mounted on said piston and having bearing surfaces at opposite sides of the cylinder, at positions intermediate the length of the cylinder, and a lever engaging said bearing surfaces and interposed operatively between the said piston and the shoe.

2. An assembly comprising two relatively rotatable structures adapted for frictional, torque-sustaining engagement with each other, one of said structures having an internal frictional-engagement face and the other of said structures comprising a mounting, a plurality of frictional-engagement shoes hinged on said mounting on an axis fixed thereon, to be turned in the same outward rotative direction for engagement with said face, levers for turning the respective shoes by reason of lateral movement of the middle parts of the levers, and respective fluid-impelled members and pressure-fluid chambers therefor substantially at the position of the shoes axially of the assembly for applying force to end portions of the respective levers for actuating them, each of the said levers being fulcrumed at one of its ends on one of the shoes and acting by lateral movement of its middle part to effect turning of another shoe.

3. An assembly comprising two relatively rotatable structures adapted for frictional, torque-sustaining engagement with each other, one of said structures having a frictional-engagement face and the other of said structures comprising a torque-sustaining mounting, a plurality of frictional-engagement shoes hinged on respective axes fixed in relation to said mounting for hinging movement of the shoes in the same rotative direction for engagement of said shoes with said frictional-engagement face, respective piston-and-cylinder assemblies having their reaction against said mounting for actuating said shoes, said assemblies being at the position of said face and of said shoes axially of the assembly and being substantially radially-acting, and each comprising means defining two cylinder chambers of different diameters but in continuation of each other and pistons slidably sealing against the walls of said chambers respectively and having their shoe-pressing strokes in the same direction, and respective pressure-fluid-supplying means each independent of the other for supplying pressure fluid to said chambers respectively.

4. An assembly as defined in claim 3 in which the recited frictional-engagement face is inwardly facing and in which the recited piston-and-cylinder assemblies are outwardly acting for moving the recited shoes into engagement with the recited face.

5. An assembly as defined in claim 3 in which the two recited pistons are rigidly connected to each other.

6. A vehicle brake of the expanding type comprising a brake-drum having an inwardly facing frictional-engagement surface, a set of shoes mounted within and movable outward into braking engagement with said surface, a piston-and-cylinder assembly radially inward from each shoe for actuating the same, each of said assemblies comprising a service piston and an emergency piston in tandem arrangement therewith, and respective pressure-fluid-supplying means each independent of the other for supplying pressure fluid to the set of service pistons and the set of emergency pistons respectively, the two said pressure-fluid-supplying means including respective control means each responsive to the will of the operator independently of the other for applying actuating fluid pressure to said service piston and said emergency piston selectively, and the said shoes being in a single, circumferentially aligned set and identically mounted for identical sustention of torque in relation to their respective mountings.

References Cited in the file of this patent

UNITED STATES PATENTS

| | | |
|---|---|---|
| 1,241,691 | White | Oct. 2, 1917 |
| 1,858,004 | Eason | May 10, 1932 |
| 1,921,287 | Farkas | Aug. 8, 1933 |
| 1,974,583 | Parker | Sept. 25, 1934 |
| 2,125,971 | White | Aug. 9, 1938 |
| 2,195,558 | Bowen | Apr. 2, 1940 |
| 2,218,201 | Lapwood | Oct. 15, 1940 |
| 2,268,605 | Mattersdorf | Jan. 6, 1942 |
| 2,287,261 | McColgan | June 23, 1942 |
| 2,324,979 | Hatch | July 20, 1943 |
| 2,365,715 | Mattersdorf | Dec. 26, 1944 |
| 2,502,152 | Hudson | Mar. 28, 1950 |

FOREIGN PATENTS

| | | |
|---|---|---|
| 700,803 | France | Jan. 2, 1931 |
| 746,995 | France | Mar. 21, 1933 |
| 779,383 | France | Jan. 14, 1935 |